US008355856B2

(12) United States Patent
Hartrey et al.

(10) Patent No.: US 8,355,856 B2
(45) Date of Patent: Jan. 15, 2013

(54) ENGINE TORQUE RESERVE SYSTEM DIAGNOSTIC SYSTEMS AND METHODS

(75) Inventors: Timothy J. Hartrey, Brighton, MI (US); Christopher E. Whitney, Highland, MI (US); Jinchun Peng, Canton, MI (US); Cheryl A. Williams, Howell, MI (US); Richard B. Jess, Haslett, MI (US)

(73) Assignee: GM Global Technology Operations LLC

( * ) Notice: Subject to any disclaimer, the term of this patent is extended or adjusted under 35 U.S.C. 154(b) by 1015 days.

(21) Appl. No.: 12/366,906

(22) Filed: Feb. 6, 2009

(65) Prior Publication Data

US 2009/0299602 A1 Dec. 3, 2009

Related U.S. Application Data

(60) Provisional application No. 61/057,570, filed on May 30, 2008.

(51) Int. Cl.

| | |
|---|---|
| ***G06F 7/00*** | (2006.01) |
| ***G06F 17/00*** | (2006.01) |
| ***G06F 19/00*** | (2011.01) |
| ***B60T 7/12*** | (2006.01) |
| ***G05D 1/00*** | (2006.01) |
| ***F02P 5/00*** | (2006.01) |

(52) U.S. Cl. ...................... 701/102; 123/406.23; 701/54

(58) Field of Classification Search ............. 123/406.23, 123/406.25, 406.26, 406.5, 406.51, 675, 123/682, 399, 436; 701/84, 85, 86, 102, 701/103, 104, 105, 110, 54, 107; 477/102, 477/107

See application file for complete search history.

(56) References Cited

U.S. PATENT DOCUMENTS

| | | | | |
|---|---|---|---|---|
| 6,994,653 | B2 * | 2/2006 | Hartmann et al. | 477/107 |
| 2005/0076882 | A1 * | 4/2005 | Rayl | 123/198 F |
| 2006/0102143 | A1 * | 5/2006 | Yagi | 123/339.11 |
| 2007/0106451 | A1 * | 5/2007 | Kuroda et al. | 701/103 |
| 2007/0168107 | A1 * | 7/2007 | Von Schwertfuehrer | 701/110 |
| 2008/0135002 | A1 * | 6/2008 | Yoshiume et al. | 123/90.12 |
| 2009/0132108 | A1 * | 5/2009 | Seel et al. | 701/22 |

* cited by examiner

*Primary Examiner* — Stephen K Cronin
*Assistant Examiner* — Sizo Vilakazi

(57) ABSTRACT

An engine control system of a vehicle comprises a reserves module and a fault diagnostic module. The reserves module controls airflow into an engine based on a driver torque request, increases the airflow into the engine when a reserve torque request is received, and outputs a torque output command for the engine based on the driver torque request. The fault diagnostic module selectively diagnoses a fault in the reserves module when the torque output command is greater than a sum of the driver torque request, a predetermined torque, and a load applied to the engine.

23 Claims, 5 Drawing Sheets

ENGINE TORQUE RESERVE SYSTEM DIAGNOSTIC SYSTEMS AND METHODS

CROSS-REFERENCE TO RELATED APPLICATIONS

This application claims the benefit of U.S. Provisional Application No. 61/057,570, filed on May 30, 2008. The disclosure of the above application is incorporated herein by reference in its entirety.

FIELD

The present disclosure relates to internal combustion engines and more particularly to engine control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the air and fuel to the cylinders increases the torque output of the engine.

Engine control systems have been developed to control engine torque output to achieve a desired torque. Traditional engine control systems, however, do not control the engine torque output as accurately as desired. Further, traditional engine control systems do not provide as rapid of a response to control signals as is desired or coordinate engine torque control among various devices that affect engine torque output.

Traditional engine control systems may ensure reliability of any calculated values by making two independent calculations using the same data. Engine control systems then compare the two calculated values before using either of the values to make control decisions. Calculating each value twice, however, may require additional processing, memory, and/or upkeep.

SUMMARY

An engine control system of a vehicle comprises a reserves module and a fault diagnostic module. The reserves module controls airflow into an engine based on a driver torque request, increases the airflow into the engine when a reserve torque request is received, and outputs a torque output command for the engine based on the driver torque request. The fault diagnostic module selectively diagnoses a fault in the reserves module when the torque output command is greater than a sum of the driver torque request a predetermined torque, and a load applied to the engine.

In other features, the fault diagnostic module diagnoses the fault when the torque output command is greater than the sum for a first period of time during a second period, wherein the second period is greater than the first period.

In still other features, the load corresponds to an air conditioning system load.

In further features, the engine control system further comprises a reserve capacity determination module. The reserve capacity determination module determines a reserve torque capacity for the engine based on a measurement of the airflow into the engine, and the fault diagnostic module selectively diagnoses the fault when the reserve torque request is greater than the reserve torque capacity.

In still further features, the fault diagnostic module selectively diagnoses the fault when the reserve torque request is greater than the reserve torque capacity by greater than a predetermined amount.

In other features, the engine control system further comprises a rate evaluation module. The rate evaluation module determines a rate of change based on the increase in the airflow, and the fault diagnostic module selectively diagnoses the fault when the rate of change is greater than a predetermined rate of change.

An engine control system for a vehicle comprises a reserves module, a reserve capacity module, and a fault diagnostic module. The reserves module controls airflow into an engine based on a driver torque request, increases the airflow into the engine when a reserve torque request is received, and outputs a torque output command for the engine based on the driver torque request. The reserve capacity determination module determines a reserve torque capacity based on a measurement of the airflow into the engine. The fault diagnostic module selectively diagnoses a fault in the reserves module when the reserve torque request is greater than the reserve torque capacity.

In further features, the fault diagnostic module diagnoses the fault when the reserve torque request is greater than the reserve torque capacity by greater than a predetermined amount.

In other features, the reserve capacity determination module determines the reserve torque capacity further based on at least one of an engine speed, a spark timing, and an engine vacuum.

In further features, the fault diagnostic module diagnoses the fault when the reserve torque request is greater than the reserve torque capacity for a first period of time during a second period, wherein the second period is greater than the first period.

In still further features, the fault diagnostic module selectively diagnoses the fault when the torque output command is greater than a sum of the driver torque request, a predetermined torque, and a load applied to the engine.

In other features, the engine control system further comprises a rate evaluation module. The rate evaluation module determines a rate of change based on the increase in the airflow, and the fault diagnostic module selectively diagnoses the fault when the rate of change is greater than a predetermined rate of change.

A method comprises: controlling airflow into an engine of the vehicle based on a driver torque request using a reserves module; increasing the airflow into the engine when a reserve torque request is received by the reserves module; outputting a torque output command for the engine based on the driver torque request using the reserves module; and selectively diagnosing a fault in the reserves module when the torque output command is greater than a sum of the driver torque request, a predetermined torque, and a load applied to the engine.

In other features, the selectively diagnosing comprises diagnosing the fault when the torque output command is greater than the sum for a first period of time during a second period, wherein the second period is greater than the first period.

In further features, the method further comprises determining a reserve torque capacity for the engine based on a measurement of the airflow into the engine and selectively diagnosing the fault when the reserve torque request is greater than the reserve torque capacity.

In still further features, the method further comprises selectively diagnosing the fault when the reserve torque request is greater than the reserve torque capacity by greater than a predetermined amount.

In other features, the method further comprises determining a rate of change based on the increase in the airflow and selectively diagnosing the fault when the rate of change is greater than a predetermined rate of change.

A method comprises: controlling airflow into an engine of the vehicle based on a driver torque request using a reserves module; increasing the airflow into the engine when a reserve torque request is received by the reserves module; outputting a torque output command for the engine based on the driver torque request using the reserves module; determining a reserve torque capacity based on a measurement of the airflow into the engine; and selectively diagnosing a fault in the reserves module when the reserve torque request is greater than the reserve torque capacity.

In other features, the selectively diagnosing comprises diagnosing the fault when the reserve torque request is greater than the reserve torque capacity by greater than a predetermined amount.

In further features, the determining comprises determining the reserve torque capacity further based on at least one of an engine speed, a spark timing, and an engine vacuum.

In other features, the selectively diagnosing comprises diagnosing the fault when the reserve torque request is greater than the reserve torque capacity for a first period of time during a second period, wherein the second period is greater than the first period.

In further features, the method further comprises selectively diagnosing the fault when the torque output command is greater than a sum of the driver torque request, a predetermined torque, and a load applied to the engine.

In still further features, the method further comprises determining a rate of change based on the increase in the airflow and selectively diagnosing the fault when the rate of change is greater than a predetermined rate of change.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
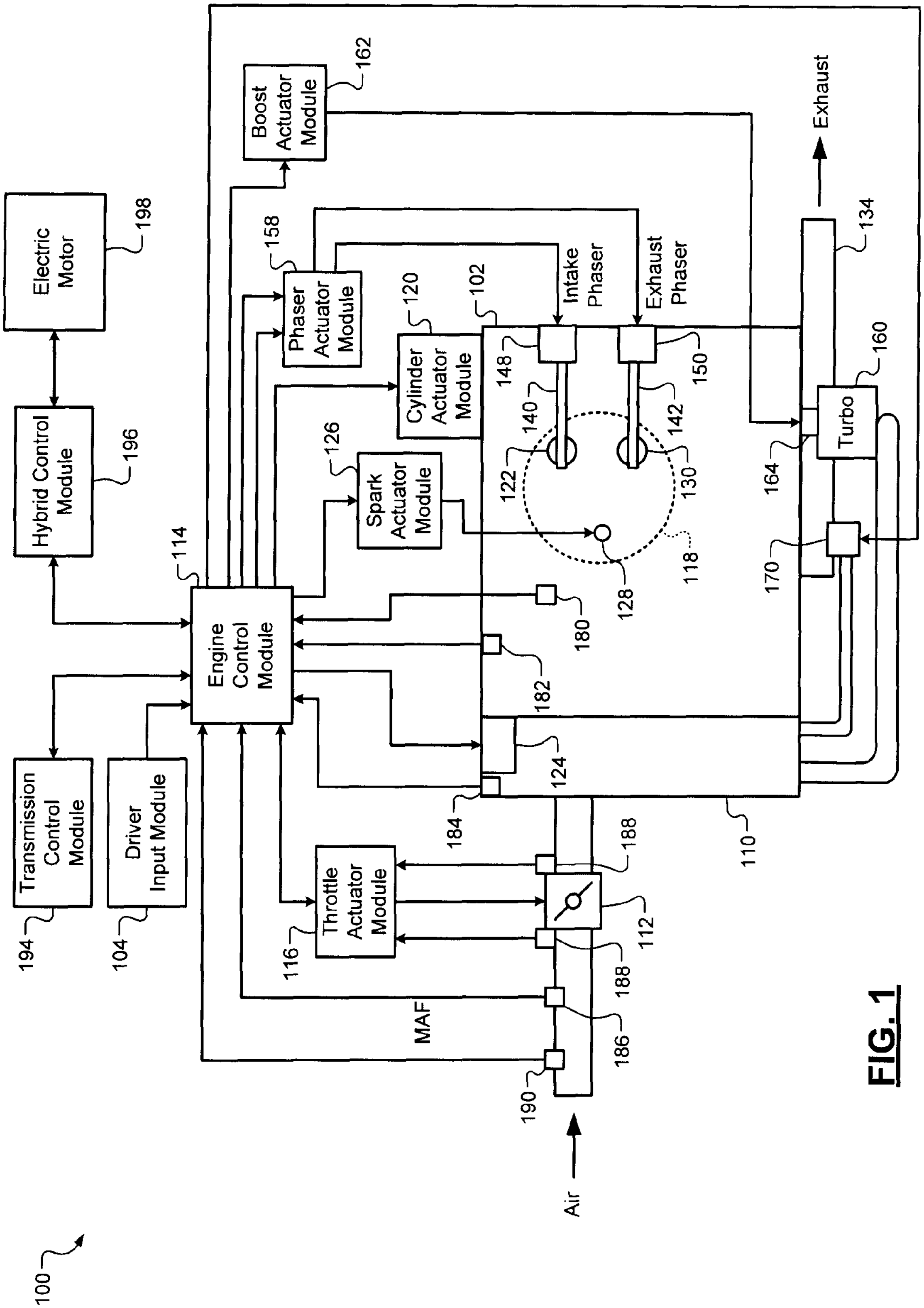
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine control system adjusts various engine actuators to control torque output by an engine. In some circumstances, the engine control system may adjust the engine actuators to create a reserve torque. For example, the engine control system may increase airflow into the engine and adjust spark timing to create the reserve torque. The reserve torque can then be quickly utilized to offset any decreases in torque output and/or engine speed that may otherwise occur.

The amount of torque that the engine is capable of producing increases as airflow into the engine increases to create the reserve torque. The engine control system, however, maintains torque output by the engine based on the amount of torque requested by the driver. As the amount of torque that the engine is capable of producing is greater than the amount of torque requested by the driver, the reliability of the reserve torque request and any actions taken to create the requested reserve torque should be verified. The engine control system according to the present application selectively diagnoses faults based on the requested reserve torque and/or torque commands generated based on the reserve torque request.

Referring now to FIG. 1, a functional block diagram of an exemplary engine system 100 is presented. While a spark ignition, gasoline-type engine is described herein, the present disclosure is applicable to other types of torque producers, not limited to gasoline-type engines, diesel-type engines, fuel cell engines, propane engines, and hybrid-type engines implementing one or more electric motors.

The engine system 100 includes an engine 102 that combusts an air/fuel mixture to produce drive torque for a vehicle based on driver inputs provided by a driver input module 104. Air is drawn into an intake manifold 110 through a throttle valve 112. An engine control module (ECM) 114 provides commands to a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes only, only a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate one or more of the cylinders to improve fuel economy.

Air from the intake manifold 110 is drawn into the cylinder 118 through an associated intake valve 122. The ECM 114 controls the amount of fuel injected by a fuel injection system 124. The fuel injection system 124 may inject fuel into the intake manifold 110 at a central location or at multiple locations, such as near an intake valve that is associated with the cylinder 118. Alternatively, the fuel injection system 124 may inject fuel directly into the cylinders.

The injected fuel mixes with the air and creates the air/fuel mixture. A piston (not shown) within the cylinder 118 compresses the air/fuel mixture. Based upon a signal from the ECM 114, a spark actuator module 126 energizes a spark plug 128 associated with the cylinder 118, which ignites the air/fuel mixture within the cylinder 118. The timing of the spark may be specified relative to the time when the piston is at its topmost position, referred to as to top dead center (TDC), the point at which the air/fuel mixture is most compressed.

The combustion of the air/fuel mixture drives the piston down, thereby rotatably driving a crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate one or more cylinders by halting provision of fuel, spark, and/or disabling the cylinders exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114.

The engine system 100 may also include a boost device that provides pressurized air to the intake manifold 110. For example, the boost device may include a turbocharger 160, as shown in FIG. 1. The turbocharger provides a compressed air charge to the intake manifold 110. The turbocharger 160 may be powered by, for example, exhaust gases flowing through the exhaust system 134. The air used to produce the compressed air charge may be taken from the intake manifold 110 and/or any other suitable source.

A wastegate 164 may allow exhaust gas to bypass the turbocharger 160, thereby reducing the turbocharger's output (or boost). The ECM 114 controls the boost device via a boost actuator module 162. For example, the boost actuator module 162 may modulate the boost of the turbocharger 160 by controlling the position of the wastegate 164.

Alternate engine systems may include a supercharger that provides compressed air to the intake manifold 110 and is driven by the crankshaft. The engine system 100 may also include an exhaust gas recirculation (EGR) valve 170, which selectively redirects exhaust gas back to the intake manifold 110 based on an EGR signal from the ECM 114.

The engine system 100 includes various sensors that each measure an engine parameter. For example, the engine system 100 includes an engine speed sensor 180 that measures engine speed in revolutions per minute (rpm). The engine speed sensor 180 may measure the engine speed, for example, based on the rotational speed of the crankshaft. The engine system 100 also includes a manifold absolute pressure (MAP) sensor 184, a mass airflow (MAF) sensor 186, a throttle position sensor (TPS) 188, an intake air temperature (IAT) sensor 190, and/or any other suitable sensor.

The MAP sensor 184 measures the pressure within the intake manifold 110. In various implementations, engine vacuum may be measured, where engine vacuum is the difference between ambient air pressure (i.e., barometric pressure) and the pressure within the intake manifold 110. The MAF sensor 186 measures mass flow rate of air through the throttle valve 112. One or more throttle position sensors, such as the TPS 188, measure the position of the throttle valve 112. The IAT sensor 190 measures the temperature of the air being drawn into the intake manifold 110. The ECM 114 may use signals from the various sensors to make control decisions for the engine system 100.

The ECM 114 may also communicate with a transmission control module 194 to coordinate shifting gears in a transmission (not shown). For example, the ECM 114 may reduce torque during a gear shift. The ECM 114 may also communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, the ECM 114, the transmission control module 194, and the hybrid control module 196 may be integrated into one or more modules.

Figure 2:
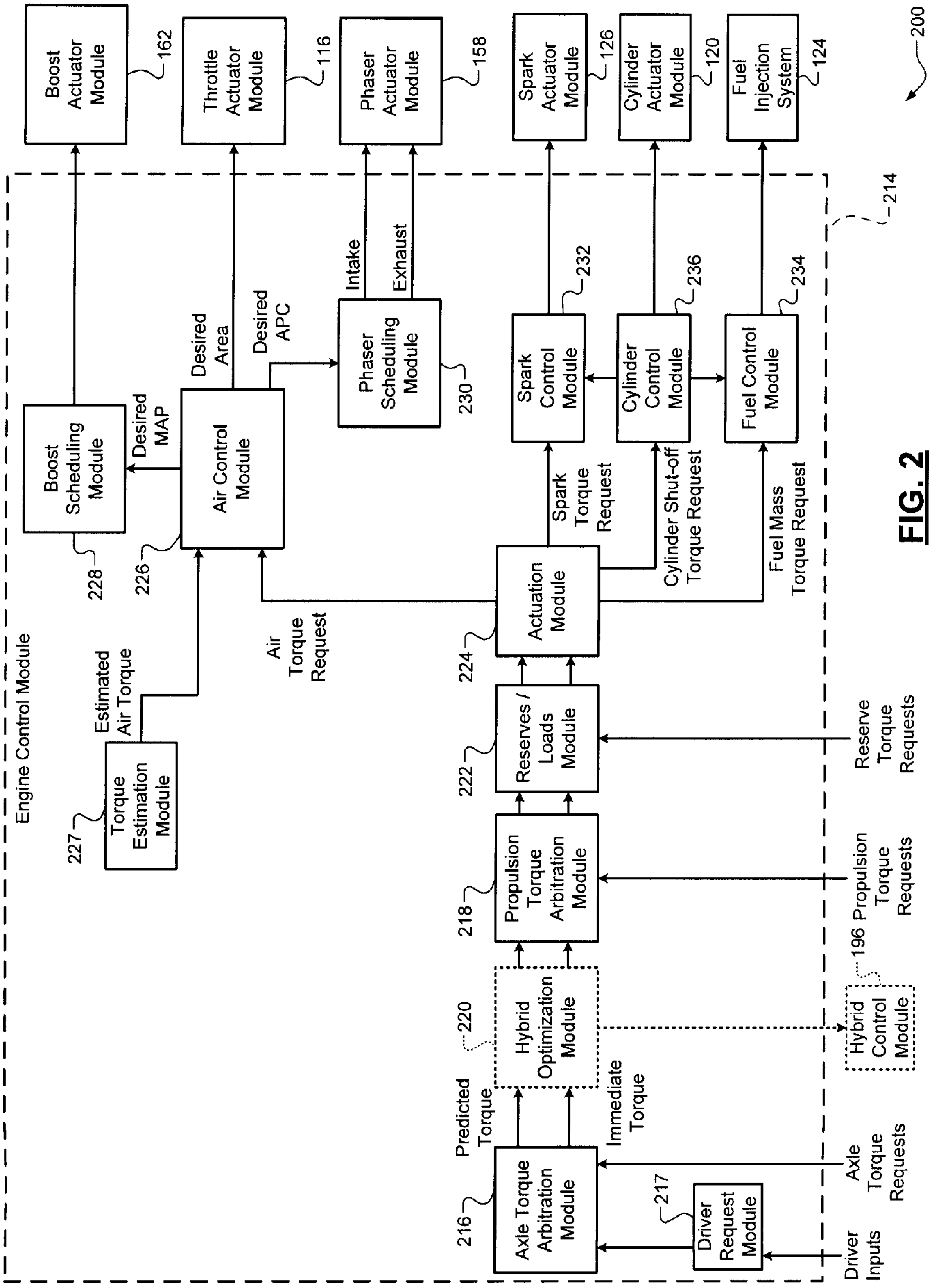
FIG. 2 is a functional block diagram of an exemplary engine control system according to the principles of the present disclosure.

Referring now to FIG. 2, a functional block diagram of an exemplary engine control system 200 is presented. An engine control module (ECM) 214 includes an axle torque arbitration module 216. The axle torque arbitration module 216 arbitrates between driver torque requests and other axle torque requests.

A driver request module 217 generates the driver torque requests based on the driver inputs provided by the driver input module 104. For example, the driver inputs may include an accelerator pedal position. Accordingly, the driver torque request may correspond to the accelerator pedal position. The driver input may also be based on cruise control, which may be an adaptive cruise control system that varies vehicle speed to maintain a predetermined following distance. Other axle torque requests arbitrated by the axle torque arbitration module 216 may include a torque reduction requested during a gear shift, a torque reduction requested during wheel slip, and/or a torque request to control vehicle speed.

The axle torque arbitration module 216 outputs a predicted torque and an immediate torque. The predicted torque is the amount of torque that will be required to meet the driver torque request and any future torque and/or speed requests. The immediate torque is the torque required at the present moment to meet current torque requests, such as torque reductions requested for shifting gears or wheel slippage.

The immediate torque may be achieved using engine actuators that respond quickly, while slower engine actuators are targeted to achieve the predicted torque. For example, the spark timing may be adjusted relatively quickly, while the cam phaser angles and the throttle position may be slower to respond. The axle torque arbitration module 216 outputs the predicted torque and the immediate torque to a propulsion torque arbitration module 218.

In various implementations, such as hybrid vehicles, the axle torque arbitration module 216 may output the predicted torque and the immediate torque to a hybrid optimization module 220. The hybrid optimization module 220 determines how much torque should be produced by the engine 102 and how much torque should be produced by the electric motor 198. The hybrid optimization module 220 then outputs modified predicted and immediate torques to the propulsion torque arbitration module 218. In various implementations, the hybrid optimization module 220 may be implemented in the hybrid control module 196.

The predicted and immediate torques received by the propulsion torque arbitration module 218 are converted from an axle torque domain (torque at the wheels) into a propulsion torque domain (torque at the crankshaft). This conversion may occur before, after, as part of, or in place of the hybrid optimization module 220.

The propulsion torque arbitration module 218 arbitrates between propulsion torque requests, including the converted predicted and immediate torques. The propulsion torque arbitration module 206 may generate an arbitrated predicted torque and an arbitrated immediate torque. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. Propulsion torque requests may also result from clutch fuel cutoff, which may reduce the engine torque output when the driver depresses the clutch pedal in a manual transmission vehicle.

Propulsion torque requests may also include an engine shutoff request, which may be initiated when a critical fault is detected. For example only, critical faults may include detection of vehicle theft, a stuck starter motor, electronic throttle control problems, and unexpected torque increases. For example only, engine shutoff requests may always win arbitration, thereby being output as the arbitrated torques, or may bypass arbitration altogether, simply shutting down the engine 102. The propulsion torque arbitration module 218 may still receive these shutoff requests so, for example, appropriate data can be fed back to other torque requesters. For example only, all other torque requestors may be informed that they have lost arbitration.

A reserve torque may be created by adjusting slower engine actuators to produce a predicted torque, while adjusting faster engine actuators to produce an immediate torque that is less than the predicted torque. For example, the throttle valve 112 can be opened, thereby increasing air flow and preparing to produce the predicted torque. Meanwhile, the spark advance may be reduced (i.e., retarded), reducing the engine torque output to the immediate torque.

The difference between the predicted and immediate torques is referred to as the reserve torque. When a reserve torque is present, the engine torque output can be quickly increased from the immediate torque to the predicted torque by changing a faster actuator (e.g., spark timing). The predicted torque is thereby achieved rapidly without waiting for a change in torque to result from an adjustment of one of the slower actuators.

A reserves/loads module 222 receives the arbitrated predicted and immediate torque requests from the propulsion torque arbitration module 206. The reserves/loads module 222 also receives reserve torque requests from various vehicle systems. For example only, an air conditioning system (not shown) that is driven by the crankshaft may generate a reserve torque request. Activation and operation of the air conditioning system draws torque from the engine 102 and decreases torque output by the engine 102 and/or engine speed. More specifically, engagement of an air conditioning compressor clutch applies a load to the engine 102. The air conditioning system may therefore cause a sag in torque output if a reserve torque is not present when the air conditioning system is activated.

Accordingly, the air conditioning system requests creation of a reserve torque before the air conditioning system is activated. Based on one or more reserve torque requests, the reserves/loads module 222 creates a reserve torque by increasing the predicted torque request (above the driver torque request). A catalyst diagnostic system, a catalyst light-off system, a new engine purging system, a power steering system, and/or other vehicle systems may also request a reserve torque. Such torque requests are referred to as reserve torque requests.

The reserved torque is used to offset the decrease in torque output that would otherwise be experienced when the air conditioning system is activated. Then, when the air conditioning system is activated, the reserves/loads module 222 may add the expected load applied by the air conditioning system to the immediate torque request. The reserves/loads module 222 transmits the predicted and immediate torque requests to an actuation module 224 after the torque requests are adjusted for reserve torque requests and loads.

The actuation module 224 receives the predicted and immediate torque requests from the reserves/loads module 222. The actuation module 224 determines how the predicted and immediate torque requests will be achieved. More specifically, the actuation module 24 generates actuator specific torque requests.

The actuation module 224 may be engine type specific, with different control schemes for gas engines versus diesel engines. In various implementations, the actuation module 224 may define the boundary between modules prior to the actuation module 224, which are engine independent, and modules that are engine dependent.

For example, in gasoline engine systems, the actuation module 224 may vary the opening of the throttle valve 112, which allows for a wide range of torque control. However, opening and closing the throttle valve 112 results in a relatively slow change in torque. Disabling cylinders also provides for a wide range of torque control, but may be similarly slow and additionally involve drivability and emissions concerns. Changing spark advance is relatively fast, but does not provide as much range of torque control. In addition, the amount of torque control possible with spark (referred to as spark capacity) changes as the air per cylinder changes.

In various implementations, the actuation module 224 may generate an air torque request based on the predicted torque request. The air torque request may be equal to the predicted torque request, causing engine airflow actuators to be adjusted to the predicted torque request. The predicted torque request can be achieved by changes to other (faster) actuators.

An air control module 226 may determine desired actuator values for slower actuators based on the air torque request. For example, the air control module 226 may control desired manifold absolute pressure (MAP), desired throttle area, and/or desired air per cylinder (APC). The desired MAP may be used to determine desired boost, and the desired APC may be used to determine desired cam phaser positions. In various implementations, the air control module 226 may also determine an amount of opening of the EGR valve 170.

A torque estimation module 227 may estimate torque output of the engine 102. This estimated air torque may be used by the air control module 226 to perform closed-loop control of engine air flow parameters, such as MAP, throttle area, and phaser positions. For example only, a torque relationship such as $$T=f(APC,S,I,E,AF,OT,\#) \quad (1)$$

may be defined, where the estimated air torque (T) is a function of air per cylinder (APC), spark advance (S), intake cam phaser position (I), exhaust cam phaser position (E), air/fuel ratio (AF), oil temperature (OT), and number of activated cylinders (#). Additional variables may be accounted for, such as the degree of opening of the EGR valve 170.

This relationship may be modeled by an equation and/or may be stored as a lookup table. The torque estimation module 227 may determine APC based on measured MAF and engine speed, thereby allowing closed loop air control based on actual air flow. The intake and exhaust cam phaser positions used may be based on actual positions, as the phasers may be traveling toward desired positions. In addition, a calibrated spark advance value may be used. This estimated air torque corresponds to an estimate of how much torque could be generated under the current air flow conditions, regardless of the actual engine torque output, which varies based on spark advance.

The air control module 226 may use the estimated air torque and/or the MAF signal in order to perform closed-loop control, based on a comparison of the estimated air torque and the air torque request. The air control module 226 may generate a desired manifold absolute pressure (MAP) signal, which is output to a boost scheduling module 228. The boost scheduling module 228 uses the desired MAP signal to control the boost actuator module 162. The boost actuator module 162 then controls the boost device, such as the turbocharger 160.

The air control module 226 may generate a desired area signal, which is output to the throttle actuator module 116. The throttle actuator module 116 then regulates the throttle valve 112 to produce the desired throttle area. The air control module 226 may also generate a desired air per cylinder (APC) signal, which is output to a phaser scheduling module 230. Based on the desired APC signal and the RPM signal, the phaser scheduling module 230 may control positions of the intake and/or exhaust cam phasers 148 and 150 using the phaser actuator module 158.

In gasoline engine systems, the actuation module 224 may also generate torque requests for faster actuators. For example, the actuation module 224 may generate a spark torque request, a cylinder shut-off torque request, and a fuel mass torque request. The actuation module 224 generates the torque requests for faster actuators based on the immediate torque request.

The spark torque request may be used by a spark control module 232 to determine how much to retard the spark (which reduces the engine torque output) from a calibrated spark advance. The spark advance values may be calibrated at various engine operating conditions. For example only, a torque relationship may be inverted to solve for desired spark advance. For a given torque request ($T_{des}$), the desired spark advance ($S_{des}$) may be determined based on $$S_{des}=T^{-1}(T_{des},APC,I,E,AF,OT,\#). \quad (2)$$

This relationship may be embodied as an equation and/or as a lookup table. The air/fuel ratio (i.e., AF) may be the actual ratio, as indicated by a fuel control module 234.

When the spark advance is set to the calibrated spark advance, the resulting torque may be as close to mean best torque (MBT) as possible. MBT refers to the maximum torque that is generated for a given air flow as spark advance is increased, while using fuel having an octane rating greater than a predetermined threshold. The spark advance at which this maximum torque occurs may be referred to as MBT spark. The calibrated spark advance may differ from MBT spark because of, for example, fuel quality (such as when lower octane fuel is used) and environmental factors. The torque at the calibrated spark advance may therefore be less than MBT. The spark control module 232 controls the spark actuator module 126 which controls the spark timing accordingly.

The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly (e.g., half of the cylinders). The cylinder control module 236 may also instruct the fuel control module 234 to stop providing fuel for deactivated cylinders and may instruct the spark control module 232 to stop providing spark for deactivated cylinders.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel mass torque request may be used by the fuel control module 234 to vary the amount of fuel provided to each cylinder. For example only, the fuel control module 234 may determine a fuel mass that, when combined with the current amount of air per cylinder, yields stoichiometric combustion. The fuel control module 234 may instruct the fuel injection system 124 to inject this fuel mass for each activated cylinder. During normal engine operation, the fuel control module 234 may attempt to maintain a stoichiometric air/fuel ratio.

The fuel control module 234 may increase the fuel mass above the stoichiometric value to increase engine torque output and may decrease the fuel mass to decrease engine torque output. In various implementations, the fuel control module 234 may receive a desired air/fuel ratio that differs from stoichiometry. The fuel control module 234 may then determine a fuel mass for each cylinder that achieves the desired air/fuel ratio. In diesel engine systems, fuel mass may be the primary actuator for controlling engine torque output.

Figure 3:
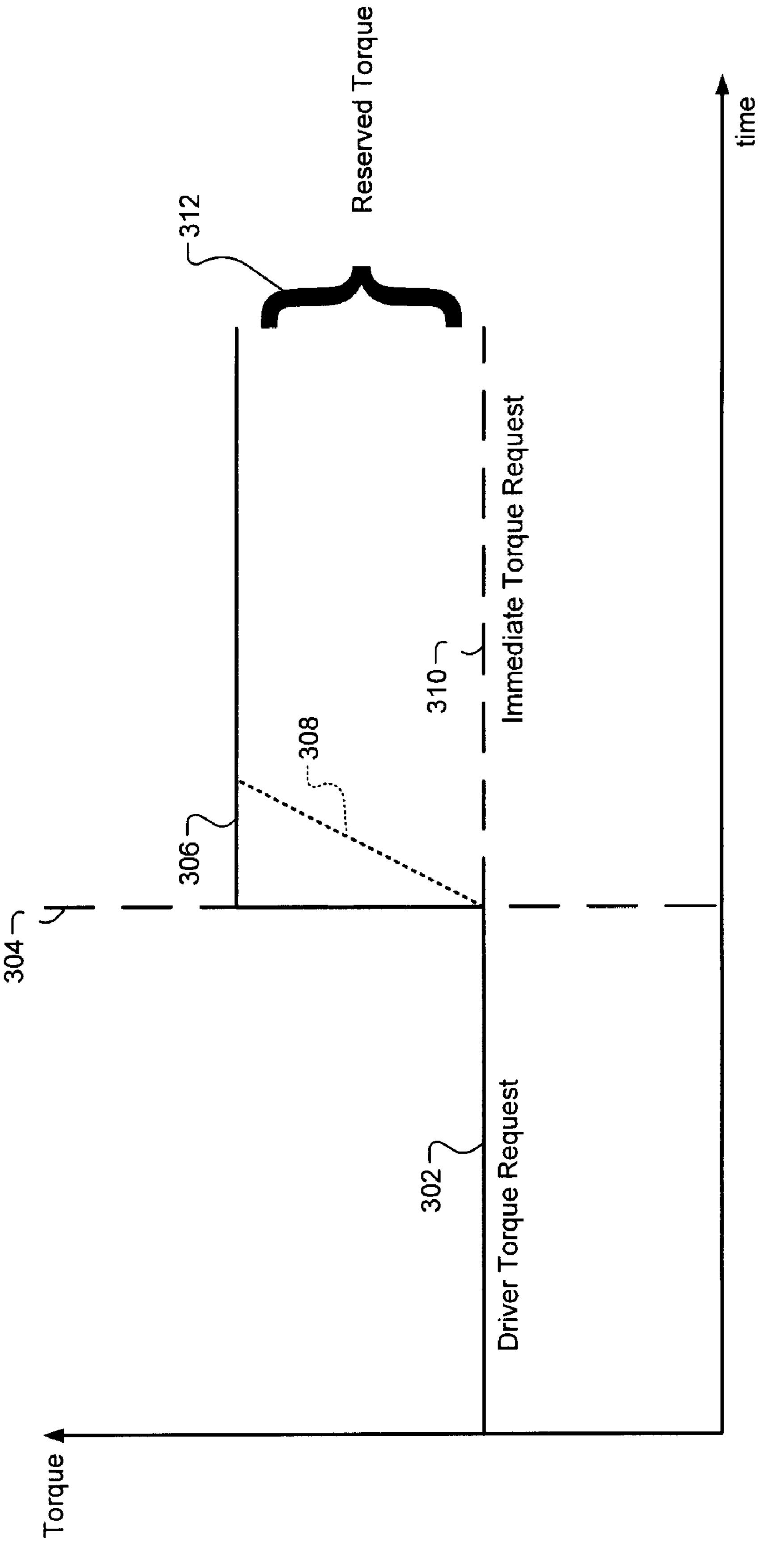
FIG. 3 is an exemplary graphical illustration of creation of a reserve torque according to the principles of the present disclosure.

Referring now to FIG. 3, an exemplary graphical illustration of creation of a reserve torque is presented. An exemplary driver torque request is illustrated by line 302. During normal engine operation, the reserves/loads module 222 outputs the predicted and immediate torque requests according to the driver torque request. In this manner, the engine actuators are adjusted based on the driver torque request.

The reserves/loads module 222 receives a reserve torque request at time 304 and commands creation of the requested reserve torque. To create the reserve torque, the reserves/loads module 222 increases the predicted torque request, thereby increasing one or more engine air flow parameters. An exemplary increased predicted torque request to create the reserve torque is illustrated by line 306.

For purposes of illustration only, FIG. 3 depicts a step increase in the predicted torque request 306 at time 304. In various implementations, the reserves/loads module 222 may limit the rate at which the predicted torque request 306 is increased. For example only, the reserves/loads module 222 may limit the rate at which the predicted torque request 306 is increased to a predetermined rate of change, such as 6.0 Nm per 12.5 ms.

The increase in the predicted torque request 306 causes an increase in one or more engine air flow parameters. For example only, MAF, MAP, air-per-cylinder, and/or other engine air parameter(s) may be increased. The estimated air torque increases as airflow into the engine 102 increases. An exemplary estimated air torque is illustrated by dashed line 308.

The reserves/loads module 222 maintains the immediate torque request at the driver torque request 302. Otherwise, an increase in torque output and/or engine speed may be experienced. An exemplary immediate torque request is depicted by line trace 310. The immediate torque request 310 may also include loads applied to the engine 102 (e.g., by the air conditioning system and/or the power steering system). As the engine airflow parameters are increased and the immediate torque request is maintained, the spark timing is adjusted (e.g., retarded) relative to the spark timing before time 304.

In summary, airflow into the engine 102 is increased and the spark timing is correspondingly adjusted (e.g., retarded) to create the reserve torque. An exemplary reserve torque is illustrated at 312. After the reserve torque 312 has been created, the spark timing can be rapidly adjusted (e.g., advanced) to offset any decrease in torque output and/or engine speed that may occur.

Figure 4:
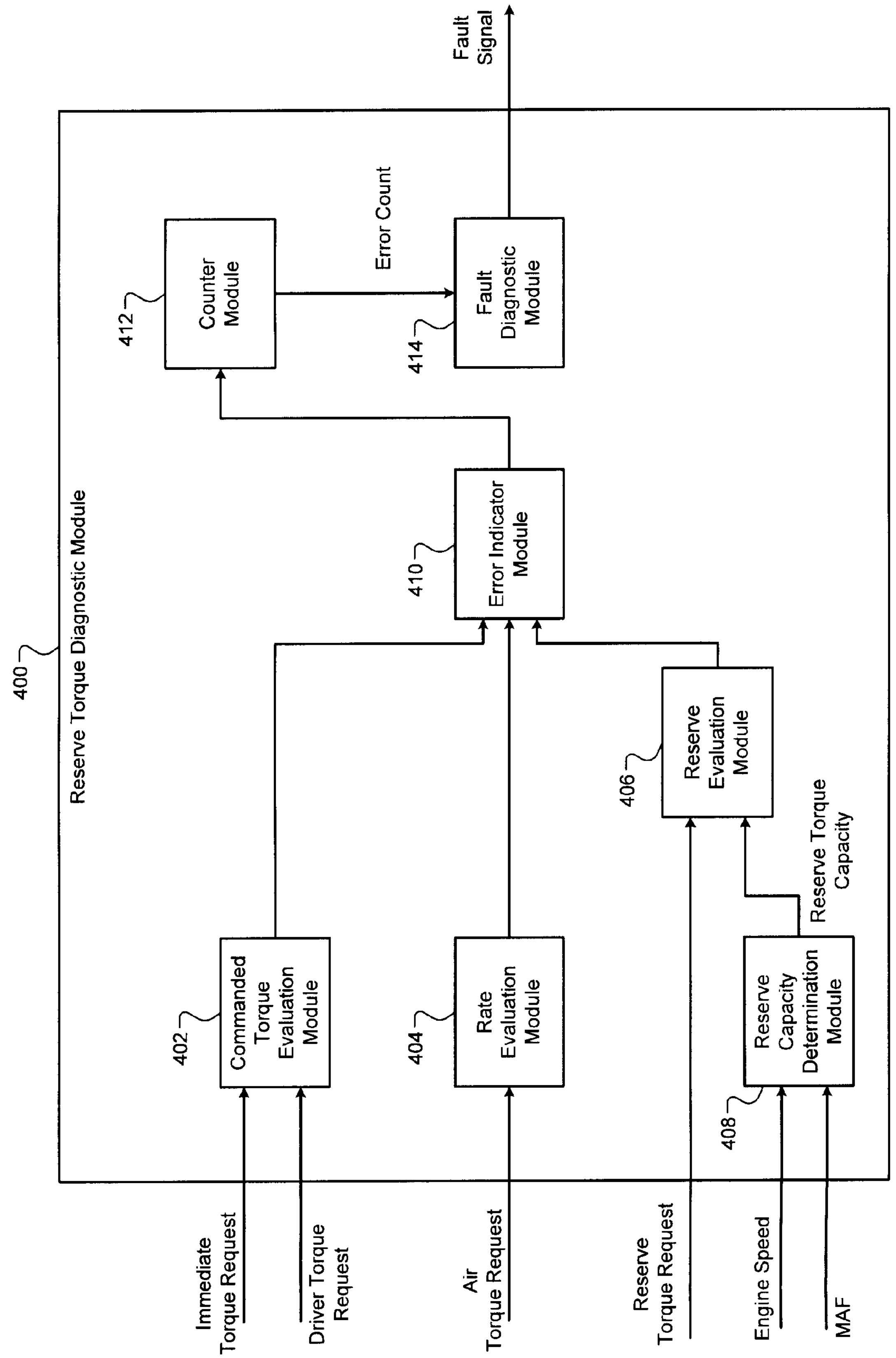
FIG. 4 is a functional block diagram of an exemplary reserve torque diagnostic module according to the principles of the present disclosure.

Referring now to FIG. 4, a functional block diagram of an exemplary implementation of a reserve torque diagnostic module 400 is presented. The reserve torque diagnostic module 400 according to the present disclosure selectively diagnoses faults in the reserves/loads module 222. The reserve torque diagnostic module 400 may be implemented within the ECM 214 or in another location.

The reserve torque diagnostic module 400 includes a commanded torque evaluation module 402, a rate evaluation module 404, a reserve evaluation module 406, and a reserve capacity determination module 408. The reserve torque diagnostic module 400 also includes an error indicator module 410, a counter module 412, and a fault diagnostic module 414.

Various parameters may be used as an indicator of fault that may be attributable to the reserves/loads module 222. For example, parameters such as the driver and immediate torque requests and/or the rate at which the predicted torque request is increased may be used. The reserve torque request itself may also be used along with the current operating conditions. Each parameter used as an indicator of fault may correspond to a predetermined type of error, such as a commanded torque error, a rate error, and a reserve request error, respectively.

The commanded torque evaluation module 402 determines whether a commanded torque error has occurred based on a difference between the immediate torque request and the driver torque request. In other words, the commanded torque evaluation module 402 determines whether a commanded torque error has occurred based on the difference between the commanded torque output of the engine 102 and the driver commanded torque. Loads applied to the engine 102 (e.g., by the air conditioning system and/or a power steering system) may also be included in the difference calculation. This difference is calculated based on the immediate torque request less a sum of the driver torque request and the loads applied to the engine 102.

The commanded torque evaluation module 402 determines whether a commanded torque error has occurred based on a comparison of the commanded torque difference and a torque threshold. For example, a commanded torque error has likely occurred when the difference is greater than the torque threshold. The torque threshold may be calibratable and may be set, for example, based on an amount of torque at which an observable change in torque output and/or engine speed will likely be experienced. A commanded torque error may be attributable to, for example, a calculation error in the reserves/loads module 222.

In other implementations, the commanded torque evaluation module 402 determines whether a commanded torque error has occurred based on a comparison of the immediate torque request with a sum of the driver torque request, the loads, and the torque threshold. In such implementations, the commanded torque evaluation module 402 determines that a commanded torque error has occurred when the immediate torque request is greater than the sum. The commanded torque evaluation module 402 generates a commanded torque error signal, which indicates whether a commanded torque error has occurred.

As stated above, the reserves/loads module 222 increases the predicted torque request above the driver torque request to increase airflow into the engine 102 and create the reserve torque requested. The reserve torque diagnostic module 400 expects that the reserves/loads module 222 limits the rate at which the predicted torque request is increased to a predetermined rate. The predetermined rate may be calibratable and may be set to, for example, 6.0 Nm per 12.5 ms.

The rate evaluation module 404 monitors the rate of change (i.e., increase) of the predicted torque request and determines whether a rate error has occurred based on the rate of change. For example only, the rate evaluation module 404 determines that a rate error has occurred when the rate of change is greater than the predetermined rate. Such a rate error may be attributable to, for example, a calculation error or a memory error of the reserves/loads module 222. The rate evaluation module 404 determines the rate of change for the predicted torque request over successive periods of time, such as every 12.5 ms. The rate evaluation module 404 generates a rate error signal, which indicates whether a rate error has occurred.

The reserve capacity determination module 408 determines a reserve torque capacity (Nm) for the engine 102. The reserve torque capacity corresponds to an amount of torque that could be reserved under the current operating conditions by adjusting the spark timing before the engine 102 would begin to stall or misfire.

The reserve capacity determination module 408 determines the reserve torque capacity based on, for example, the engine speed, the MAF, the engine vacuum, the spark timing, and/or any other suitable parameter. The reserve capacity determination module 408 may also store the reserve torque capacity in one or more predetermined locations, such as in memory (not shown).

The reserve torque diagnostic module 400 expects that the reserves/loads module 222 and the system generating the reserve torque request have knowledge of the reserve torque capacity. For example, the reserves/loads module 222 and/or the system generating the reserve torque request may be expected to read the reserve torque capacity stored in the predetermined location. Accordingly, the reserve torque diagnostic module 400 expects that the reserves/loads module 222 would not accommodate reserve torque requests that exceed the reserve torque capacity when operating properly. A reserve torque request that is greater than the reserve torque capacity is likely invalid and honoring the reserve torque request would cause the engine 102 to stall or run irregularly.

The reserve evaluation module 406 determines whether a reserve request error has occurred based on a comparison of the reserve torque request and the reserve torque capacity. For example only, the reserve evaluation module 406 determines that a reserve request error has occurred when the reserve torque request is greater than the reserve torque capacity. The reserve evaluation module 406 generates a reserve request error signal based on the determination, which indicates whether a reserve request error has occurred. The reserve request error is likely attributable to the reserves/loads module 222.

In various implementations, the reserve evaluation module 406 allows the reserve torque request to exceed the reserve capacity by at least a predetermined error amount before indicating that an error has occurred. In other words, the reserve evaluation module 406 may determine that a reserve request error has occurred when the reserve torque request is greater than the reserve torque capacity by at least the predetermined error amount. The predetermined error amount may be calibratable and may be set to, for example, 60.0 Nm.

The error indicator module 410 selectively increments an error counter based on the commanded torque error signal, the rate error signal, and the reserve request error signal. More specifically, the error indicator module 410 selectively increments the error counter based on whether a commanded torque error, a rate error, or a reserve request error has occurred.

For example, the error indicator module 410 increments the error counter when a commanded torque error, a rate error, or a reserve request error has occurred. The error indicator module 410 evaluates the error signals and determines whether to increment the error counter at predetermined rate, such as once every 12.5 ms. The error counter may be implemented in any suitable location, such as within the counter module 412. In various implementations, one error counter may be provided for each different type of error.

The fault diagnostic module 414 determines whether a fault has occurred based on the error counter and generates a fault signal accordingly. More specifically, the fault diagnostic module 414 selectively diagnoses a fault based on the number of errors counted over a period of time.

For example, the fault diagnostic module 414 may diagnose a fault when at least 100.0 ms of errors have been counted during a period of 200.0 ms. In other words, when the errors are indicated at a rate of once every 12.5 ms, the fault diagnostic module 414 diagnoses a fault when at least 8.0 errors are counted during a period of 200.0 ms. The period of time may correspond to, for example, a most recent period of time. A fault diagnosed may be attributable to the reserves/loads module 222.

The ECM 214 and/or any other suitable module or system may take remedial action when a fault is diagnosed. For example only, the ECM 214 may take remedial action by shutting down the engine 102 or reducing torque output by the engine 102 to the driver torque request. The ECM 214 may also set an indicator, such as illuminate an indicator, such as a "check engine" light.

Figure 5:
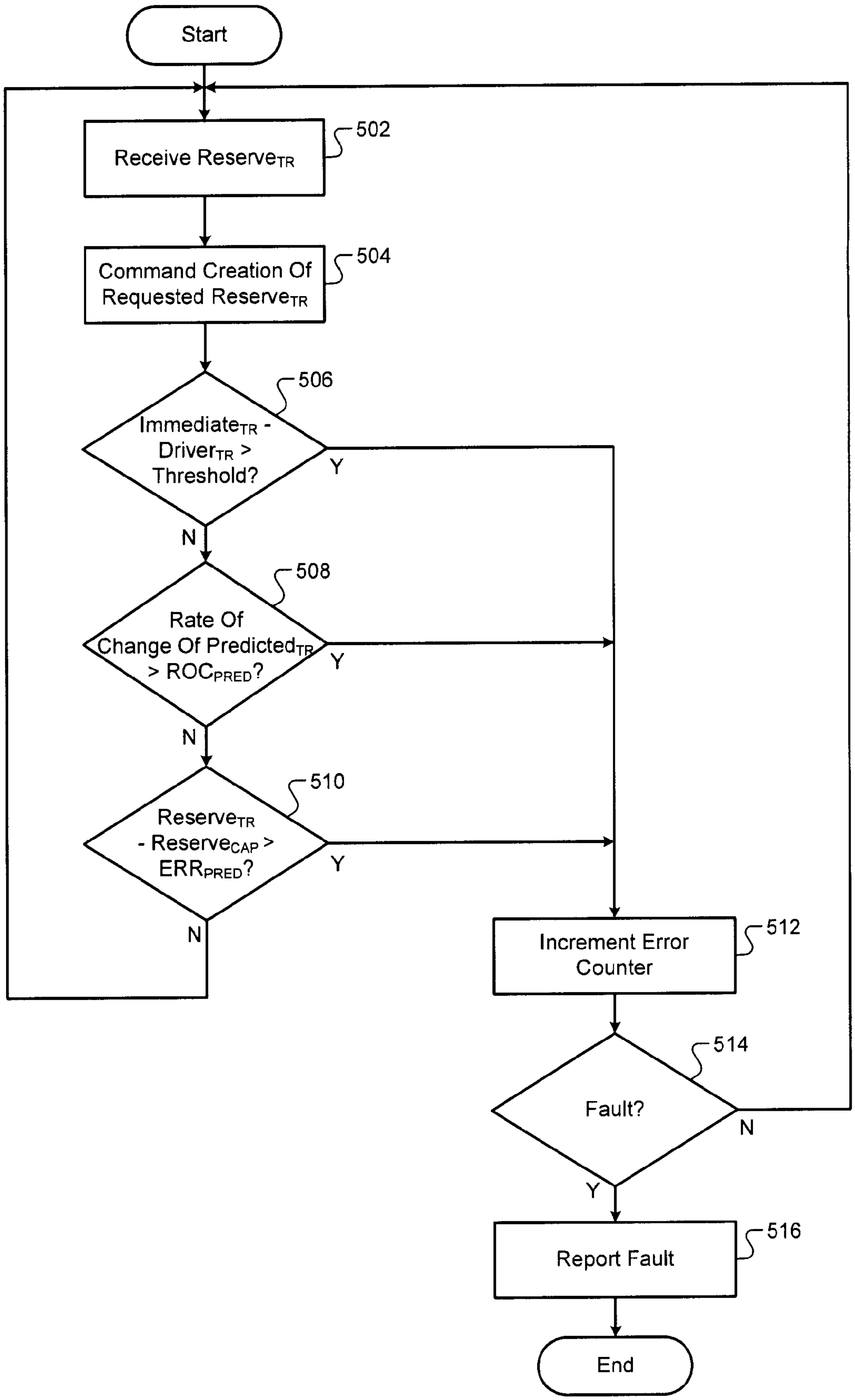
FIG. 5 is a flowchart depicting exemplary steps performed by the reserve torque diagnostic module according to the principles of the present disclosure.

Referring now to FIG. 5, a flowchart depicting exemplary steps performed by the reserve torque diagnostic module 400 is presented. Control begins in step 502 where control receives the reserve torque request ($Reserve_{TR}$). Control continues in step 504 where control commands creation of the reserve torque request. In other words, control commands an increase in airflow into the engine 102 and a corresponding adjustment of the spark timing.

Control continues to step 506 where control determines whether the difference between the immediate torque request ($Immediate_{TR}$) and the driver torque request ($Driver_{TR}$) is greater than a torque threshold. In other implementations, control determines whether the immediate torque request is greater than a sum of the driver torque request and the torque threshold. If true, control transfers to step 512 (discussed further below); otherwise, control continues to step 508. Loads applied to the engine 102 may also be accounted for in step 506. The torque threshold may be calibratable and may be set based on, for example, an amount of torque at which the driver may observe a change in engine speed and/or torque output by the engine 102.

When creation of the reserve torque request is commanded, control may expect that the rate at which the predicted torque request is increased will be limited to the predetermined rate of change. In step 508, control determines whether the rate of change of the predicted torque request ($Predicted_{TR}$) is greater than a predetermined rate of change ($ROC_{PRED}$). If true, control transfers to step 512; otherwise, control continues to step 510. The predetermined rate of change may be calibratable and may be set to, for example, 6.0 Nm per 12.5 ms.

Control may also expect that the system for which the reserve torque request is generated has knowledge of the amount to which the spark timing may be retarded before the engine 102 would misfire. In other words, control may expect that the reserve torque capacity is known. In step 510, control determines whether the difference between the reserve torque request and the reserve torque capacity is greater than the predetermined error amount ($ERR_{PRED}$).

In other implementations, control determines whether the reserve torque request is greater than a sum of the reserve torque capacity and the predetermined error amount in step 510. If true, control transfers to step 512; otherwise, control returns to step 502. The predetermined error amount may be calibratable and may be set to, for example, 60.0 Nm. Control determines the reserve torque capacity based on, for example, the MAF, the engine speed, the engine vacuum, the spark timing, and/or any other suitable parameter.

In step 512, control increments the error counter. In this manner, control increments the error counter when the immediate torque request is greater than the sum of the driver torque request and the torque threshold, when the rate of change of the predicted torque exceeds the predetermined rate of change, and when the reserve torque request is greater than the sum of the reserve torque capacity and the predetermined error amount. In other words, control increments the error counter when a commanded torque error has occurred, when a rate error has occurred, or when a reserve request error has occurred.

Control continues to step 514 where control determines whether a fault has occurred in the reserves/loads module 222. If true, control continues to step 516; otherwise, control returns to step 502. Control determines whether a fault has occurred based on the error counter. For example, control may determine that a fault has occurred when at least a predetermined number of errors have occurred over a period of time. The predetermined number of errors and the predetermined time may be calibratable and may be set to, for example, 8.0 (corresponding to 100.0 ms) and 200.0 ms, respectively.

In step 516, control reports the diagnosed fault. For example, control may set a flag in a predetermined location in memory. Control may also take remedial action when a fault is diagnosed, such as shutting down the engine 102 and/or illuminating an indicator, such as the "check engine" light. Control then ends.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system for a vehicle, comprising:

a reserves module that controls airflow into an engine based on a driver torque request, that increases said airflow into said engine when a reserve torque request is received, and that outputs a torque output command for said engine based on said driver torque request; and a fault diagnostic module that selectively diagnoses a fault in said reserves module when said torque output command is greater than a sum of said driver torque request, a predetermined torque, and a load applied to said engine.

2. The engine control system of claim 1 wherein said fault diagnostic module diagnoses said fault when said torque output command is greater than said sum for a first period of time during a second period, and wherein said second period is greater than said first period.

3. The engine control system of claim 1 wherein said load corresponds to an air conditioning system load.

4. The engine control system of claim 1 further comprising a reserve capacity determination module that determines a reserve torque capacity for said engine based on a measurement of said airflow into said engine, wherein said fault diagnostic module selectively diagnoses said fault when said reserve torque request is greater than said reserve torque capacity.

5. The engine control system of claim 4 wherein said fault diagnostic module selectively diagnoses said fault when said reserve torque request is greater than said reserve torque capacity by greater than a predetermined amount.

6. The engine control system of claim 1 further comprising a rate evaluation module that determines a rate of change based on said increase in said airflow, wherein said fault diagnostic module selectively diagnoses said fault when said rate of change is greater than a predetermined rate of change.

7. An engine control system for a vehicle, comprising:

a reserves module that controls airflow into an engine based on a driver torque request, that increases said airflow into said engine when a reserve torque request is received, and that outputs a torque output command for said engine based on said driver torque request;

a reserve capacity determination module that determines a reserve torque capacity based on a measurement of said airflow into said engine; and a fault diagnostic module that selectively diagnoses a fault in said reserves module when said reserve torque request is greater than said reserve torque capacity.

8. The engine control system of claim 7 wherein said fault diagnostic module diagnoses said fault when said reserve torque request is greater than said reserve torque capacity by more than a predetermined amount.

9. The engine control system of claim 7 wherein said reserve capacity determination module determines said reserve torque capacity further based on at least one of an engine speed, a spark timing, and an engine vacuum.

10. The engine control system of claim 7 wherein said fault diagnostic module diagnoses said fault when said reserve torque request is greater than said reserve torque capacity for a first period of time during a second period, and wherein said second period is greater than said first period.

11. The engine control system of claim 7 wherein said fault diagnostic module selectively diagnoses said fault when said torque output command is greater than a sum of said driver torque request, a predetermined torque, and a load applied to said engine.

12. The engine control system of claim 7 further comprising a rate evaluation module that determines a rate of change based on said increase in said airflow, wherein said fault diagnostic module selectively diagnoses said fault when said rate of change is greater than a predetermined rate of change.

13. A method for a vehicle, comprising:

controlling airflow into an engine of said vehicle based on a driver torque request using a reserves module;

increasing said airflow into said engine when a reserve torque request is received by said reserves module;

outputting a torque output command for said engine based on said driver torque request using said reserves module; and selectively diagnosing a fault in said reserves module when said torque output command is greater than a sum of said driver torque request, a predetermined torque, and a load applied to said engine.

14. The method of claim 13 wherein said selectively diagnosing comprises diagnosing said fault when said torque output command is greater than said sum for a first period of time during a second period, and wherein said second period is greater than said first period.

15. The method of claim 13 further comprising:

determining a reserve torque capacity for said engine based on a measurement of said airflow into said engine; and selectively diagnosing said fault when said reserve torque request is greater than said reserve torque capacity.

16. The method of claim 15 further comprising selectively diagnosing said fault when said reserve torque request is greater than said reserve torque capacity by greater than a predetermined amount.

17. The method of claim 13 further comprising:

determining a rate of change based on said increase in said airflow; and selectively diagnosing said fault when said rate of change is greater than a predetermined rate of change.

18. A method for a vehicle, comprising:

controlling airflow into an engine of said vehicle based on a driver torque request using a reserves module;

increasing said airflow into said engine when a reserve torque request is received by said reserves module;

outputting a torque output command for said engine based on said driver torque request using said reserves module;

determining a reserve torque capacity based on a measurement of said airflow into said engine; and selectively diagnosing a fault in said reserves module when said reserve torque request is greater than said reserve torque capacity.

19. The method of claim 18 wherein said selectively diagnosing comprises diagnosing said fault when said reserve torque request is greater than said reserve torque capacity by greater than a predetermined amount.

20. The method of claim 18 wherein said determining comprises determining said reserve torque capacity further based on at least one of an engine speed, a spark timing, and an engine vacuum.

21. The method of claim 18 wherein said selectively diagnosing comprises diagnosing said fault when said reserve torque request is greater than said reserve torque capacity for a first period of time during a second period, and wherein said second period is greater than said first period.

22. The method of claim 18 further comprising selectively diagnosing said fault when said torque output command is greater than a sum of said driver torque request, a predetermined torque, and a load applied to said engine.

23. The method of claim 18 further comprising:

determining a rate of change based on said increase in said airflow; and selectively diagnosing said fault when said rate of change is greater than a predetermined rate of change.

* * * * *